(12) United States Patent
Moreno Mengibar et al.

(10) Patent No.: US 8,484,025 B1
(45) Date of Patent: Jul. 9, 2013

(54) MAPPING AN AUDIO UTTERANCE TO AN ACTION USING A CLASSIFIER

(71) Applicants: Pedro J. Moreno Mengibar, Jersey City, NJ (US); Martin Jansche, New York, NY (US); Fadi Biadsy, New York, NY (US)

(72) Inventors: Pedro J. Moreno Mengibar, Jersey City, NJ (US); Martin Jansche, New York, NY (US); Fadi Biadsy, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/644,986

(22) Filed: Oct. 4, 2012

(51) Int. Cl.
*G10L 15/28* (2006.01)
(52) U.S. Cl.
USPC ........ 704/255; 704/257; 704/256.2; 704/270; 704/9; 704/10
(58) Field of Classification Search
USPC ................ 704/231, 241, 232, 255, 236, 239, 704/244, 256, 259, 257, 256.2, 233, 9, 8, 704/243, 240, 270, 10; 706/20, 12
See application file for complete search history.

(56) References Cited

U.S. PATENT DOCUMENTS

| | | | | |
|---|---|---|---|---|
| 5,822,729 A | * | 10/1998 | Glass | 704/255 |
| 5,960,397 A | * | 9/1999 | Rahim | 704/244 |
| 6,243,695 B1 | | 6/2001 | Assaleh et al. | |
| 6,964,023 B2 | * | 11/2005 | Maes et al. | 715/811 |
| 7,567,902 B2 | | 7/2009 | Davis et al. | |
| 2005/0038647 A1 | * | 2/2005 | Baker | 704/231 |
| 2005/0049865 A1 | * | 3/2005 | Yaxin et al. | 704/239 |
| 2007/0078658 A1 | | 4/2007 | Virji et al. | |
| 2008/0154591 A1 | * | 6/2008 | Kujirai et al. | 704/231 |
| 2008/0154595 A1 | * | 6/2008 | Nelken | 704/240 |
| 2008/0215311 A1 | * | 9/2008 | Chelba et al. | 704/9 |
| 2012/0166183 A1 | * | 6/2012 | Suendermann et al. | 704/9 |
| 2012/0215539 A1 | * | 8/2012 | Juneja | 704/254 |

\* cited by examiner

*Primary Examiner* — Vijay B Chawan

(74) *Attorney, Agent, or Firm* — McDonnell Boehnen Hulbert & Berghoff LLP

(57) ABSTRACT

Disclosed embodiments relate to mapping an utterance to an action using a classifier. One illustrative computing device includes a user interface having an input component. The computing device further includes a processor and a computer-readable storage medium, having stored thereon program instructions that, upon execution by the processor, cause the computing device to perform a set of operations including: receiving an audio utterance via the input component; determining a text string based on the utterance; determining a string-feature vector based on the text string; selecting a target classifier from a set of classifiers, wherein the target classifier is selected based on a determination that a string-feature criteria of the target classifier corresponds to at least one string-feature of the string-feature vector; and initiating a target action that corresponds to the target classifier.

25 Claims, 3 Drawing Sheets

MAPPING AN AUDIO UTTERANCE TO AN ACTION USING A CLASSIFIER

BACKGROUND

Unless otherwise indicated herein, the materials described in this section are not prior art to the claims in this application and are not admitted to be prior art by inclusion in this section.

Computing devices such as mobile phones and tablets, have become increasingly popular in recent years. For a user, a computing device offers a variety of services including those provided by software applications such as media players, personal information managers, and web browsers. To provide an enhanced benefit to a user, some computing devices may initiate an action relating to these services or other services based on an audio utterance (utterance) received from the user.

BRIEF SUMMARY

In one aspect, an illustrative computing device includes a user interface having an input component. The computing device further includes a processor and a computer-readable storage medium, having stored thereon program instructions that, upon execution by the processor, cause the computing device to perform a set of operations, the set including receiving an utterance via the input component; determining a text string based on the utterance; determining a string-feature vector based on the text string; selecting a target classifier from a set of classifiers, where the target classifier is selected based on a determination that a string-feature criteria of the target classifier corresponds to at least one string-feature of the string-feature vector; and initiating a target action that corresponds to the target classifier.

In another aspect, an illustrative method involves receiving, by a computing device, an utterance; determining a text string based on the utterance; determining a string-feature vector based on the text string; receiving sensor data; determining a sensor-feature vector based on the sensor data; selecting a target classifier from a set of classifiers, where the target classifier is selected based on a determination that a string-feature criteria of the target classifier corresponds to at least one string-feature of the string-feature vector and a sensor-feature criteria of the target classifier corresponds to at least one sensor-feature in the sensor-feature vector; and initiating a target action that corresponds to the target classifier.

In another aspect, an illustrative computer-readable storage medium has stored thereon program instructions that, upon execution by a computing device, cause the computing device to perform a set of operations including receiving an audio utterance; determining a text string based on the utterance; determining a string-feature vector based on the text string; receiving sensor data; determining a sensor-feature vector based on the sensor data; selecting a target classifier from a set of classifiers, wherein the target classifier is selected based on a determination that a string-feature criteria of the target classifier corresponds to at least one string-feature of the string-feature vector and a sensor-feature criteria of the target classifier corresponds to at least one sensor-feature in the sensor-feature vector; and initiating a target action that corresponds to the target classifier.

In another aspect, an illustrative method involves receiving an utterance; determining a text string based on the utterance; determining a string-feature vector based on the text string; receiving sensor data; determining a sensor-feature vector based on the sensor data; determining an identified action; and generating a classifier, where the classifier has a string-feature criteria that corresponds to at least one string-feature in the string-feature vector, has a sensor-feature criteria that corresponds to at least one sensor-feature in the sensor-feature vector, and corresponds to the identified action.

DETAILED DESCRIPTION

Figure 1:
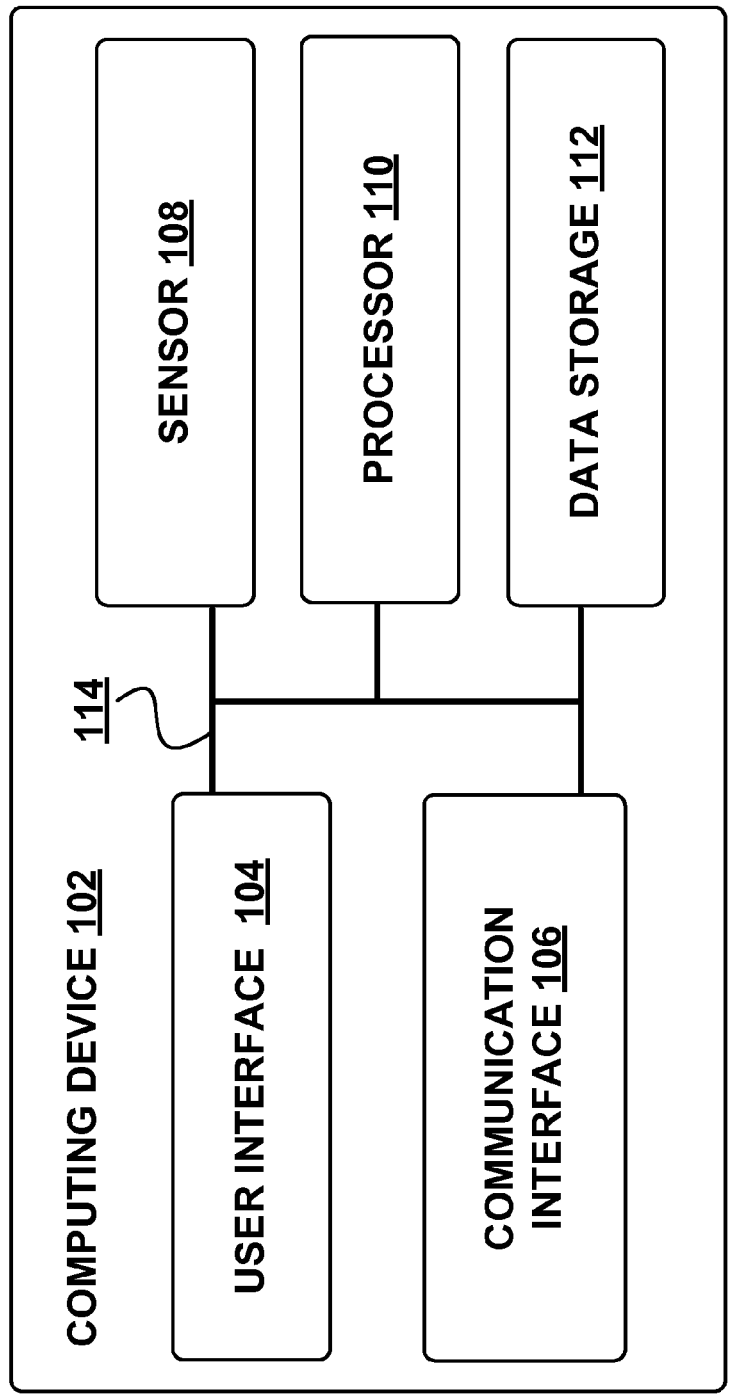
FIG. 1 is a simplified block diagram of an illustrative computing device.

Throughout this disclosure, the term "a" or "an" refers to "at least one," and the term "the" refers to "the at least one," unless otherwise specified.

Illustrative embodiments of computing devices and methods are described herein and are not meant to be limiting. It will be readily understood that certain aspects of the disclosed computing devices and methods may be arranged and combined in a wide variety of different configurations, all of which are contemplated herein.

In the following detailed description, reference is made to the accompanying figures, which form a part thereof. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure may be arranged, substituted, combined, separated, and designed in a wide variety of different configurations, all of which are contemplated herein.

I. Overview

In the context of computer-based speech recognition, the process of mapping an utterance (e.g., "call mom") to a particular action (e.g., placing a phone call to a contact designated as "mom") may involve two phases. In a first phase, the utterance is mapped to a text string. In a second phase, the text string is mapped to an action. Due to the computational complexity involved in each of these phases, some computing devices may outsource one or more of the functions involved in each phase to a server computing device (server) that may be better suited to handle such complex computations, in an arrangement that is often referred to as "cloud" computing. However, the use of feature-based classifiers (classifiers) in the second phase may, among other things, reduce computational complexity and/or may reduce or eliminate the computing device's need to outsource select functions to the server.

It may be desirable for a computing device such as a mobile phone to provide a speech-recognition feature without the support of a cloud-based server. Accordingly, an example embodiment may include a mobile phone that can autonomously provide such a speech-recognition feature, together with accurate results, but without having support from a cloud-based server.

In the context of a server supporting speech recognition functionality on a computing device, in the first phase, an utterance is mapped to a text string. In this phase, a computing device may encode a received utterance and send the encoded utterance to a server. Then, the server may determine a text string that represents the encoded utterance. The server may make this determination using an Automatic Speech Recognition (ASR) module, which receives the encoded utterance as input, and provides a text string representing the encoded utterance as output. As a simple example, the ASR module may receive an encoding of the utterance "call mom" as input, and may (in this instance accurately) provide a corresponding text string "call mom" as output. The ASR module may use any ASR technique now know or later developed. Typically, ASR modules employ highly complex and resource-intensive analysis techniques and may involve the use of acoustic, dictionary, and language models, among other things.

In the second phase, the text string is mapped to an action. In the second phase, the server may analyze the text string using a parsing and semantic analysis (PSA) module. PSA modules seek to gain a deep understanding of the syntax and semantics of the text string, and like ASR modules, often involve highly complex and resource-intensive analysis techniques.

Due to the complexity of each of the two phases, the functions involved in each phase are typically offloaded from the computing device (that initially receives the utterance) to a server that may have relatively greater computational power and/or other system resources. However, in some instances, this may not be possible, practical, or desired. For example, the computing device may have limited or no access to the server. For example, the computing device may be configured to connect to the server using a cellular wireless connection, but may lack sufficient cellular wireless coverage to make the connection. Further, even when the server is accessible, the cellular device's exchange of data with the server may provide an undesired delay in the process of mapping the utterance to the action.

In one embodiment of the present method, classifiers are used instead of the PSA module in the second phase described above. Classifiers provide a relatively less complex solution for mapping a text string to an action. In some embodiments, the computing device may select classifiers based on various string-features of the text string. The use of classifiers in this manner reduces or eliminates the need to deeply understand the semantics of the text string. This allows the computing device to determine an appropriate action based on the text string with a high level of accuracy, but with reduced computational complexity as compared to, for example, use of a PSA module.

In other embodiments, the computing device may select classifiers based further on various sensor-features. Sensor-features may be determined based on sensor data received by the computing device. By further considering these sensor-features, the computing device may determine an appropriate action with an even higher level of accuracy, but again with reduced computational complexity.

Further, due to the manner in which the classifier-based second phase is implemented, there may be instances in which a scaled-down version of an ASR module may be appropriate and practical in the first phase. While a scaled-down ASR module may be less accurate at mapping an utterance to a text string, the effect on the overall accuracy of mapping the utterance to an action may be minimal or even non-existent due to the way in which the classifier-based technique is used in the second phase. Further, a scaled-down ASR module typically has less computational complexity. As a result, the first phase may also be performed entirely on the computing device. As such, in some embodiments, the computing device may map an utterance to an action and then initiate that action without outsourcing any related functions to a server.

The present method may be described as having two functional components, namely a "training" component where a computing device generates one or more classifiers, and a "runtime" component where a computing device initiates an action based on one or more of the generated classifiers.

II. Illustrative Computing Device

Referring now to FIG. 1, a simplified block diagram of an illustrative computing device 102 is shown. By way of example and without limitation, the computing device 102 may take the form of a gaming device, a portable media player, a cellular mobile telephone, a tablet, a desktop or laptop computer, a television, and/or a device that controls one or more of these or other devices (e.g., a device that controls a television, a video recording system or an audio system).

The computing device 102 may include a user-interface 104, a communication interface 106, a sensor 108, a processor 110, and a data storage 112, all of which may be electronically connected to each other via a system bus 114 or other connection mechanism.

The user-interface 104 may function to allow the computing device 102 to interact with a human or non-human user, such as to receive input from a user and to provide output to the user. Thus, user-interface 104 may include input components such as a microphone, keypad, keyboard, touch-sensitive or presence-sensitive panel, computer mouse, trackball, or joystick. The user-interface 104 may also include output components such as a display screen (which, for example, may be combined with a presence-sensitive panel), CRT, LCD, LED, a display using DLP technology, printer, light bulb, and/or other similar devices, now known or later developed. The user-interface 104 may also be configured to generate audible output(s), via a speaker, speaker jack, audio output port, audio output device, earphones, and/or other similar devices, now known or later developed.

The communication interface 106 functions to allow the computing device 102 to communicate, using analog or digital modulation, with other devices, access networks, and/or transport networks. For example, a communication interface may take the form of a wired interface, such as an Ethernet, Token Ring, or USB port. As another example, a communication interface may take the form of a wireless interface, such as a Wifi, BLUETOOTH®, global positioning system (GPS), or a wide-area wireless (e.g., WiMAX or LTE) interface.

The sensor 108 functions to gather sensor data associated with the computing device 102. Non-limiting examples of the sensor 108 may include a movement, positioning, and/or environmental sensor such as an accelerometer, compass, gyroscope, GPS receiver, or ambient light sensor. Other example sensors may include audio and/or video sensors such an image-capturing sensor (e.g., a still or video camera).

The processor 110 may include one or more general purpose processors (e.g., microprocessors) and/or one or more special purpose processors (e.g., DSPs, GPUs, FPUs, network processors, or ASICs). The data storage 112 may include one or more volatile and/or non-volatile storage components, such as magnetic, optical, flash, or organic storage, and may be integrated in whole or in part with processor 110. Data storage 112 may include removable and/or non-removable components.

Generally speaking, the processor 110 may be capable of executing program instructions (e.g., compiled or non-compiled program logic and/or machine code) stored in the data storage 112 to carry out the various functions described herein. Therefore, the data storage 112 may include a non-transitory computer-readable storage medium, having stored thereon program instructions that, upon execution by the computing device 102 (i.e., by a component included therein, such as the processor 110), cause the computing device 102 to perform any of the methods, processes, operations, or functions disclosed herein and/or shown in the accompanying drawings. Accordingly, the computing device may be configured to perform any of the of the methods, processes, operations, or functions disclosed herein and/or shown in the accompanying drawings

III. Illustrative Methods

As discussed above, the present method may be described as having two functional components, namely a training component and a runtime component. In the training component, a computing device 102 generates classifiers based on a string-based feature vector (string-feature vector) and/or a sensor-based feature vector (sensor-feature vector), together with an indicated action. In the runtime component, a computing device 102 selects one or more of the classifiers generated in the training component, and initiates a corresponding action.

A. Training Component

Figure 2:
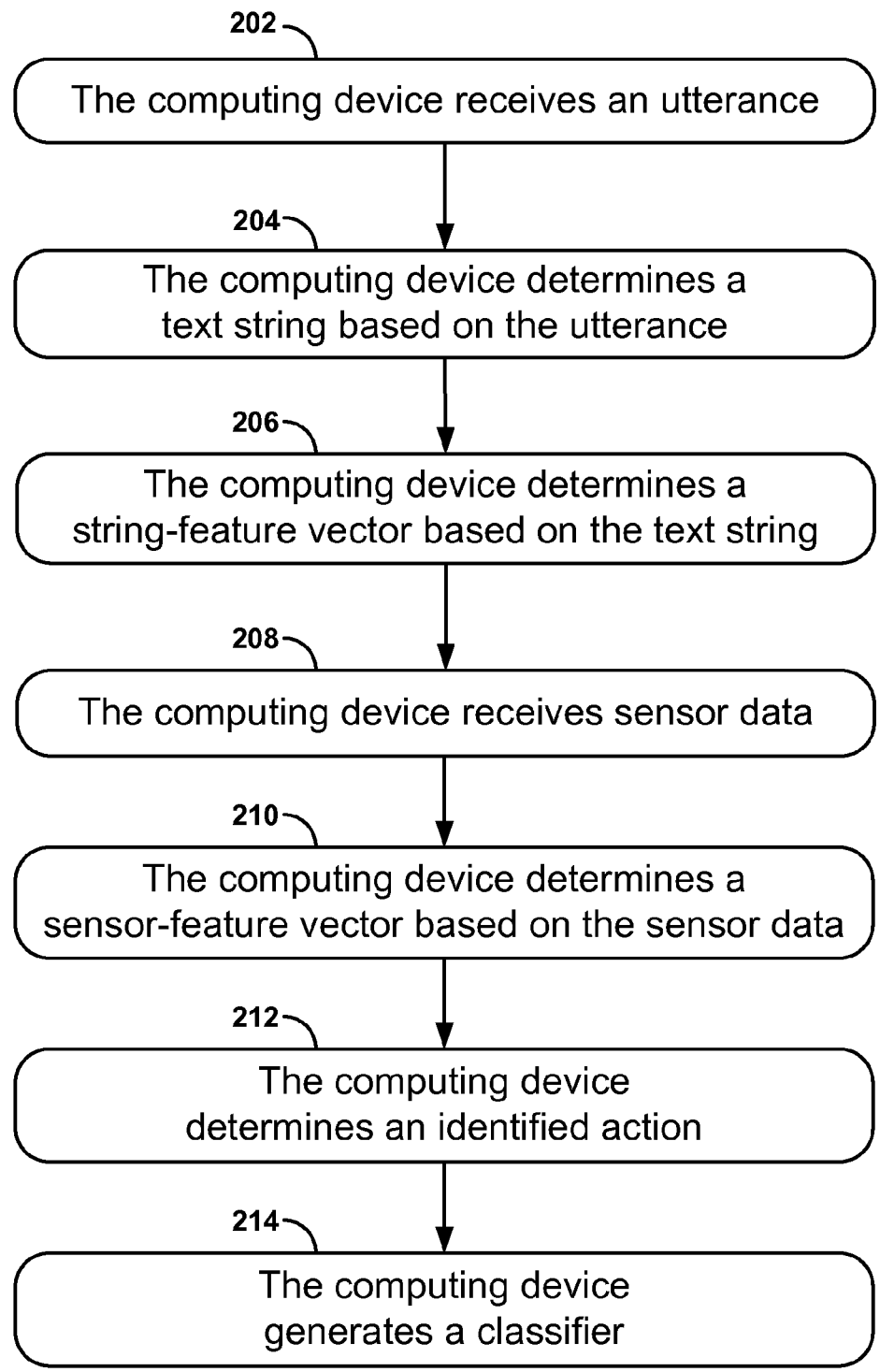
FIG. 2 is a flow chart showing a training functional component of an illustrative method.

Referring now to FIG. 2, a flow chart of a training component of an illustrative method is shown. At block 202, the computing device 102 receives an utterance. For example, the computing device 102 may receive the utterance from a user via a microphone included in or coupled with the computing device. At block 204, the computing device 102 determines a text string based on the utterance, such as by using an ASR module.

1. Determine String-Feature Vector

At block 206, the computing device 102 determines a string-feature vector based on the text string. A string-feature vector incudes one or more string-features. These string-features may be distinguished from utterance-features (e.g., mel frequency cestrum coefficients) that are typically used in connection with ASR modules and that are derived directly from an utterance. On the other hand, string-features are derived from a text string (e.g., the output of an ASR module). As such, string-features may be considered as features at the "string-level" or "sentence-level" and provide conceptually higher level information as compared to utterance-features.

Several non-limiting examples of string-features will now be discussed. In discussing string-features in this disclosure, use of "term" refers to a single word (e.g., "navigate" or "John"), multiple contiguous words (e.g., "directions to," or "direct me to"), or a logically grouped set of characters (e.g., "www.website123.com").

One example of a string-feature may be a "term identity" that indicates whether, how frequently, and/or a position in which, a given term is contained in a corresponding text string. For example, consider the text string "direct me to a gas station" and a particular term identity string-feature, namely for the term "direct me to." In this example, the string-feature may indicate that the term "direct me to" occurs once in the string, and that the term's position may be defined as the first three words of the text string.

As another example, a string-feature may be a part-of-speech identity that indicates whether, how frequently, and/or a position in which, a word with a given part-of-speech is contained in a corresponding text string. For example, consider again the text string "direct me to a gas station" and a particular part-of-speech identity string-feature, namely for the part-of-speech "noun." In this example, the string-feature may indicate that a noun occurs three times in the string (for the words "me," "gas," and "station"), together with the respective word positions within the text string (i.e., the second, fifth, and sixth words).

As another example, a string-feature may be a lexical class identity that indicates whether, how frequently, and/or a position in which, a word with a given lexical class (e.g., numbers, letters, number-letter hybrid, URL, data, time, etc.) is contained in a corresponding text string. For example, consider again the text string "direct me to a gas station" and a particular lexical class identity string-feature, namely for the lexical class "letters." In this example, the string-feature may indicate that a word with a "letters" lexical class occurs six times (once for each word of the text string), and at the respective positions within the text string. As another example, consider the text string "go to website123.com" and a particular lexical class identity string-feature, namely for the lexical class "URL." In this example, the string-feature may indicate that a word with a "URL" lexical class occurs once (for "website123.com"), together with the position as the third word of the text string.

The example string-features described above are non-limiting. Indeed, other string-features such as those based on syntactic properties of a text strong may also be used. Further, in some instances, a text string may be sent to a translation service module that converts a text string in one language to a text string in another language. The translated text string may then be used as a basis for determining the string-feature vector. For example, a non-English text string may be converted into an English text string, and a string-feature vector of the non-English text string may be determined based on the English text string.

2. Determine Sensor-Feature Vector

In addition to the computing device 102 determining a string-feature vector of the text string, in one embodiment the computing device may also determine a sensor-feature vector based on sensor data received by the computing device 102. Returning again to FIG. 2, at block 208, the computing device 102 receives sensor data, for example, via the sensor 108. At block 210, the computing device 102 determines a sensor-feature vector based on the sensor data. As a parallel to the string-feature vector, the sensor-feature vector may contain one or more sensor-features.

Non-limiting examples of sensor-features will now be discussed in connection with select types of the sensor 108. As one example, the computing device 102 determines a sensor-feature based on sensor data received from an accelerometer or a GPS receiver. In this instance, the sensor-feature may indicate a travel-speed of the computing device 102. The computing device 102 may determine such a travel-speed using techniques now known, or later developed.

As another example, the computing device 102 determines a sensor-feature based on sensor data received from an image-capturing sensor. In this instance, the sensor-feature may indicate a user identity (e.g., from one of a set of potential user identities) of the computing device 102. The computing device 102 may determine such a user identity using facial-recognition techniques now known, or later developed.

3. Generate Classifier

Once the computing device 102 has determined the string-feature vector and/or the sensor-feature vector as described above, additional functions may be performed to generate an appropriate classifier for an identified action. Returning again to FIG. 2, at block 212, the computing device 102 determines an identified action that a computing device may initiate.

In one embodiment, the function at block 212 may include the computing device 102 receiving a user's selection of the identified action from a list of actions (e.g., where a user seeks to explicitly select an identified action to train a classifier). In another embodiment, the function may include the computing device 102 determining the identified action in response to other user input (e.g., where a user uses a computing device in a traditional manner and the identified action is triggered by the user's input).

At block 214, the computing device 102 generates a classifier having at least two properties. The first property is that the classifier has a string-feature criteria that corresponds to at least one string-feature in the string-feature vector. The second property is that the classifier corresponds to the identified action.

Since the classifier is designed to have a string-feature criteria that corresponds to a string-feature, the concept of the string-feature criteria may be best understood in connection with the description of the various string-feature examples provided above. As such, a classifier's string-feature criteria may include, for example, a term identity criteria, a part-of-speech identity criteria, and/or a lexical class identity criteria.

For example, a classifier may have a term identity criteria specifying that a text string must contain the word "gas." A more specific term identity criteria may specify that a text string must contain the word "gas" at one or more particular positions in the text string. The string-feature criteria of the classifier may also include other criteria of the same or other types, such as a term identity criteria for another term (e.g., "station"), or a part-of-speech identity criteria (e.g., specifying that a text string must contain at least two nouns and one verb, or a noun before a verb). String-feature criteria may specify a variety of appropriate conditions in connection with string-features, such as through the use of threshold values and ranges.

The function of the computing device 102 generating a classifier may include the computing device either creating a new classifier or modifying an existing classifier. If the identified action does not correspond to a previously created classifier, a new classifier may be created to correspond to the identified action. However, if the identified action already corresponds to a previously created classifier, then that classifier may instead be modified appropriately (e.g., by supplementing or amending its string-feature criteria). In another embodiment, separate classifiers may be created that each have different string-feature criteria, but that correspond to the same identified action. Classifiers may also be assigned a ranking to prioritize one classifier over another when both classifiers have a string-feature criteria that corresponds to a given string-feature vector. Notably, the degree of correspondence may also be used in determining priority.

In one embodiment, a computing device 102 generates a plurality of classifiers each of which may correspond to a different action that may be initiated by a computing device. Such actions may include any action or group of actions that may be performed by a computing device, including for example, launching an application (e.g., a web-browser or a mapping application), performing application-related tasks (e.g., loading a website, providing directions, sending an email or SMS, placing a phone call, or scheduling a calendar appointment), simulating input (e.g., entering text in a text field), changing a setting (e.g., increasing the volume or setting an alarm), and combinations thereof.

In one embodiment, the computing device 102 may have a generally limited number of potential actions that it may initiate, and therefore the computing device may generate classifiers for each potential action. In another embodiment, the computing device 102 may define a particular subset of potential actions (from a larger set of actions) for which classifiers may be generated. For example, the subset may include actions that may be initiated without Internet-connectivity (e.g., increasing the volume or taking a photo). This may be particularly appropriate in instances where the functions involved in the first and second phases are being performed on the computing device 102, and therefore the computing device 102 does need Internet-connectivity either to map the received utterance to an action, or to initiate (and complete) that action.

In one embodiment, a classifier may also correspond to an argument template that the computing-device 102 may use for limited or "shallow" parsing. For example, the text string "give me directions to XYZ" may map to a classifier based on a term-identity criteria for the term "give me directions to." The argument template corresponding to that classifier may indicate, for example, that the next term is expected to be a destination. Therefore, the text string may be parsed specifically for an argument (i.e., a term) at that position. As a result, the classifier may correspond to an action where the computing device 102 launches a mapping software application and provides driving directions to that parsed destination. This type of shallow parsing is likely to be considerably less complex than traditional parsing (e.g., as used in the PSA module described above), as the former benefits from the argument template described above. This template helps guide and focus any parsing that needs to be performed.

Classifiers may also be arranged in a hierarchy where a set of classifiers may include a set of sub-classifiers arranged as children to a parent super-classifier. For example, if there is a common string-feature criteria in all classifiers in a group of classifiers, that common string-feature criteria may be used as the string-feature criteria of a super-classifier. The super classifier is arranged as a parent-classifier to the classifiers in the group of classifiers, each of which are sub-classifiers to the parent-classifier. Among other things, this hierarchical arrangement may improve efficiency in the function of selecting an appropriate classifier as described below in the runtime component.

In one embodiment, a classifier-learning service (CLS) (e.g., a linear classifier-service) using learning techniques now known or later developed, may be used to generate classifiers and define appropriate string-feature criteria for the identified action in accordance with the general design and behavior aspects described above.

As discussed above, in addition to the computing device 102 determining a string-feature vector, in one embodiment the computing device 102 also determines a sensor-feature vector based on sensor data received by the computing device 102. In such an embodiment, the classifier may include a third property, namely that the classifier has a sensor-feature criteria that corresponds to at least one sensor-feature in the sensor-feature vector.

Since the classifier may be designed to have a sensor-feature criteria that corresponds to a sensor-feature, the concept of the sensor-feature criteria may best be understood in connection with the description of the sensor-feature examples provided above. As such, a classifier's sensor-feature criteria may include, for example, a travel-speed criteria and/or a user identity criteria.

For example, a classifier may have a travel-speed criteria specifying that a travel-speed sensor-feature must indicate a travel-speed with a particular value (or within in a particular range, etc.). The string-feature criteria of the classifier may also include other criteria of the same or other types, such as a user-identity criteria specifying that a user identity sensor-feature must indicate a particular user.

Notably, all discussions provided above with respect to the computing device 102 generating a classifier (relating to use of priorities, CLSs, hierarchies, etc.) are likewise applicable to classifiers having the additional third property that the given classifier has a sensor-feature criteria that corresponds to at least one sensor-feature in the sensor-feature vector.

B. Runtime Component

In the runtime component of the present method, a computing device 102 selects one or more of the classifiers generated in the training component and initiates a corresponding action.

1. Determine String-Feature and Sensor-Feature Vectors

Figure 3:
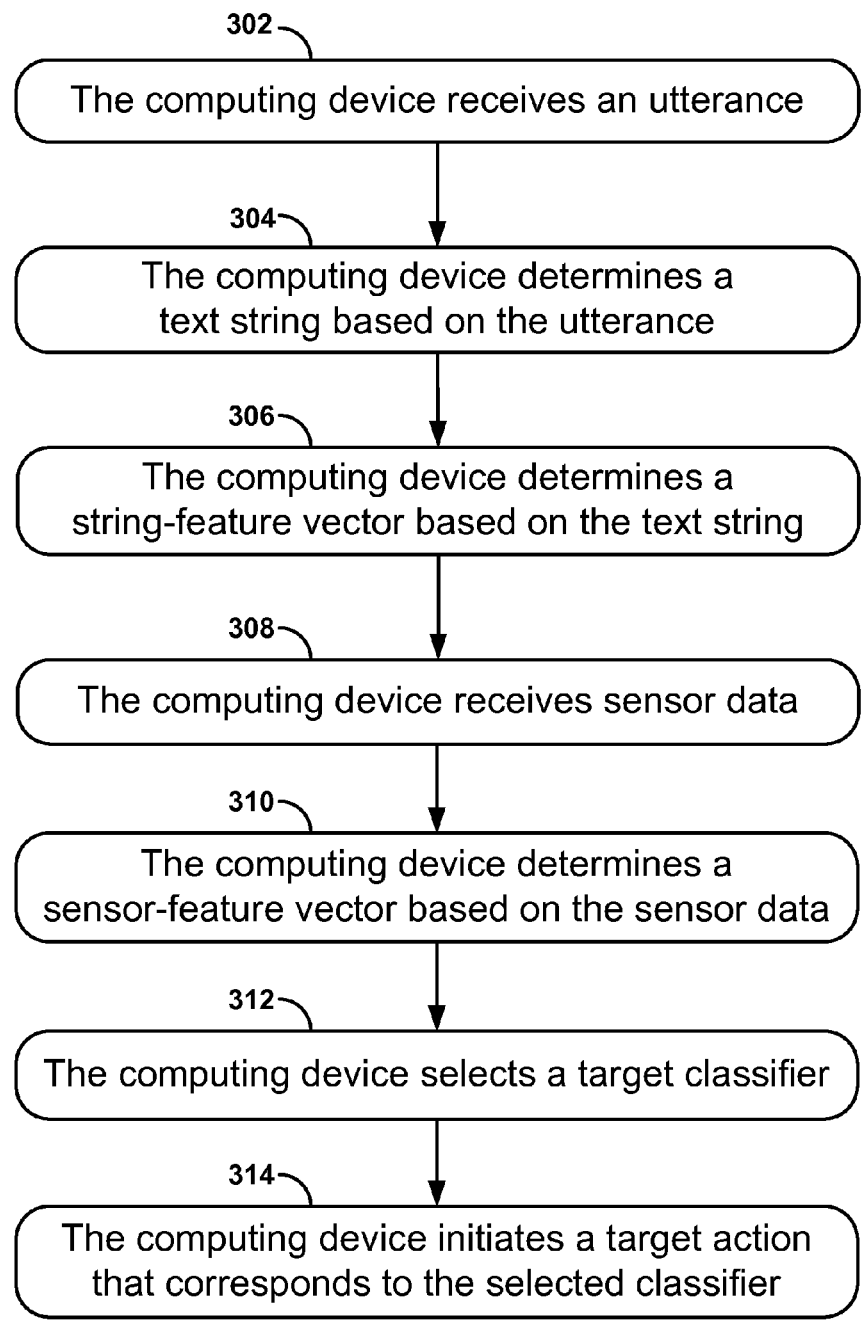
FIG. 3 is a flow chart showing a runtime functional component of an illustrative method.

Referring now to FIG. 3, a flow chart showing a runtime component of an illustrative method is shown. In the runtime component, blocks 302, 304, 306, 308, and 310 mirror blocks 202, 204, 206, 208, and 210, respectively, as previously described in the training component. As such, at block 302, the computing device 102 receives an utterance. At block 304, the computing device 102 determines a text string based on the utterance. At block 306, the computing device 102 determines a string-feature vector based on the text string. At block 308, the computing device 102 receives sensor data, and at block 310, the computing device 102 determines a sensor-feature vector based on the sensor data.

2. Select Classifier Based on String-Feature Criteria

In the runtime component, the determined feature vectors are compared against feature criteria of a set of previously generated classifiers to determine a target classifier. As such, at block 312, the computing device 102 selects a target classifier (e.g., from a set of classifiers). The computing device 102 selects the target classifier based on the computing device determining that a string-feature criteria of the target classifier corresponds to at least one string-feature of the string-feature vector.

In one respect, the function of selecting a target classifier may best be understood as opposite to the function of generating a classifier as described in the training component. To illustrate, if in the training component a computing device 102 generates a classifier C based on a text string S and an action A, then a computing device may appropriately select the classifier C based on the string S in the runtime component. At block 314 in the runtime component, the computing device 102 initiates a target action that corresponds to the target classifier, which in the example provided above would be the action A.

As a result of a computing device 102 generating classifiers in the manner described in the training component, in the runtime component a particular classifier may provide the benefit of mapping two or more different text strings to the same target action. For example, the computing device 102 may generate a classifier based on the first text-string "turn up the ringer volume" and based on an identified action of increasing a ringer volume. Then, the computing device 102 may modify that classifier based on the second text-string "increase the ringer level" (and based on the same identified action). As a result, the string-feature criteria of the classifier corresponds both to a first string-feature vector determined based on the first text-string, and to a second string-feature vector determined based on the second text-string. As such, both the first and second text-strings map to the same action, namely increasing a ringer volume.

As another example, with an appropriate classifier the computing device 102 may map each of the text strings "direct me to a gas station," "give me directions to a gas station," and "where can I fill up my tank?" to the same action (e.g., launching a mapping application and providing directions to a gas station), which the computing device 102 may then initiate. As discussed above, such mappings may be made without a deep semantic understanding of each text string (e.g., via a PSA module). Instead, such mappings rely on the generation and selection of classifiers in complementary training and runtime components of the present method.

3. Select Classifier Based on Sensor-Feature Criteria

The computing device 102 may select a target classifier based further on the computing device 102 determining that a sensor-feature criteria of the target classifier corresponds to at least one sensor-feature in the sensor-feature vector. As discussed above, the computing device 102 determines the sensor-feature vector based on sensor data that it receives. As such, the computing device 102 may map the combination of a text string (based on an utterance that the computing device received) and sensor data (that the same computing device received), to a target action.

With this additional consideration of sensor data, a classifier that would otherwise be selected as a target classifier may instead be determined to be a non-target-classifier (having a corresponding non-target-action). For instance, consider a computing device 102 that determines a string-feature vector and a sensor-feature vector in the manners described above. In this instance, despite the fact that a string-feature criteria of the classifier corresponds to at least one string-feature in the string-feature vector, the computing device 102 may determine that the classifier is a non-target classifier since a sensor-feature criteria of the classifier does not correspond to any sensor-feature in the sensor-feature vector.

It should be appreciated that a non-target-classifier for one pair of feature vectors however, may be a target classifier for another pair of feature vectors. As such, even in the event that two computing device 102 determine the same text string, each computing device may select a different target classifier, and therefore initiate a different action. This may also occur with a single computing device 102 that receives two utterances (in two separate instances). Indeed, even if those two utterances map to the same text string, in each instance, the computing device 102 may select a different target classifier based on the sensor-feature vector determined by the computing device in each respective instance. This may be particularly beneficial in instances where a text string may have multiple semantic meanings, but where a sensor-feature vector may assist in determining the appropriate one. Non-limiting use-case examples illustrating this benefit are provided below.

4. First Use-Case Example

Travel-Speed Considered

In a first use-case example, a computing device 102 determines a text string "navigate to brand-ABC" based on an utterance received from a user. This text string may be considered to have at least two semantic meanings, each corresponding to a different action potentially intended by the user. A first meaning corresponds to a first action where the computing device 102 launches a mapping application and provides mapping information (e.g., directions) relating to a point of interest associated with brand-ABC (e.g., a brand-ABC retail store). A second meaning corresponds to a second action where the computing device 102 launches a non-mapping application, such as an application associated with brand-ABC (e.g., a brand-ABC "app"), or a web-browsing application followed by loading a website associated with brand-ABC (e.g., brand-ABC.com).

Continuing with the first example, assume that two classifiers have been generated, each having a string-feature criteria that corresponds to a string-feature in the string-feature vector determined based on the text string. Further assume that the first classifier has a travel-speed criteria specifying that a travel-speed sensor-feature must indicate a travel-speed above a threshold value of forty miles per hour, and that the first classifier corresponds to the first action. Further assume that the second classifier has a travel-speed criteria specifying that a travel-speed sensor-feature must indicate a travel-speed at or below the threshold value of forty miles per hour, and that the second classifier corresponds to the second action.

It should be understood that the underlying logic responsible for generating these two classifiers (or any classifiers) may not need to be actually realized for use of the classifiers to be effective. Indeed, a given correlation between one or more feature vectors and a particular action in the training component may presumably exist in the runtime component. However, highlighting the potential underlying reasoning for some examples may be useful in explaining how classifiers may provide certain benefits in practice.

Still continuing with the first example, one explanation for the underlying reasoning of the two classifiers may be as follows. If a travel-speed of a computing device 102 is greater than a threshold value, a reasonable conclusion may be that the computing-device is traveling in a vehicle (e.g., a car), and therefore the user of the computing device is likely interested in a mapping/navigation action. However, if the travel-speed is at or below the threshold value, a reasonable conclusion may be that the computing-device 102 is not traveling in a vehicle, and therefore the user is less likely interested in a mapping/navigation action, but instead is likely more interested in navigating to a website or launching another non-mapping application.

As such, in the runtime component of the first example, the computing device 102 determines a travel-speed sensor-feature based on sensor data obtained from an accelerometer or a GPS receiver. Then, the computing device 102 selects the appropriate classifier based on both the string-feature vector and the sensor-feature vector (i.e., based on the computing station's travel-speed) and initiates the appropriate action.

5. Second Use-Case Example

Consideration of User-Identity

In a second example, a computing device 102 determines a text string "send a message saying on my way to John" based on an utterance received from a user. This text string may be considered to have at least two semantic meanings, each corresponding to a different action potentially intended by the user. A first meaning corresponds to a first action where the computing device 102 sends an email to a contact identified as John with a text body of "on my way." A second meaning corresponds to a second action where the computing device 102 sends an SMS message to a contact identified as John with a text body of "on my way."

Like the first example, assume that two classifiers have been generated, each having a string-feature criteria that corresponds to a string-feature in the string-feature vector determined based on the text string. Further assume that the first classifier has a user-identity criteria specifying that a user-identity sensor-feature must indicate a first user, and that the first classifier corresponds to the first action. Finally, assume that the second classifier has a user-identity criteria specifying that a user-identity sensor-feature must indicate a second user, and that the second classifier corresponds to the second action. With respect to the underlying reasoning supporting the generation of these classifiers, it may be the case that the first and second users simply have a usage history that suggests a respective intention for the phrase "send a message." (i.e., as to whether the user intends to send an email or send a text message). These usage histories may therefore create appropriate classifiers in the training component.

As such, in the runtime component of the second example, the computing device 102 determines a user-identity sensor-feature based on facial-recognition analysis of sensor data obtained from an image-capturing sensor. Then, the computing device 102 selects the appropriate classifier based on both the string-feature vector and the sensor-feature vector (i.e., based on the user of the computing station) and initiates the appropriate action. Accordingly, if the user-identity is a first user, the first classifier is selected, and the first action is initiated. If the user-identity is a second user, the second classifier is selected, and the second action is initiated. As a related benefit, the target actions for the classifiers in this example may be further tailored to a particular user. For example, the target actions may further select a default "from" field in the message to match the respective identified user.

6. Use a Classifier to Validate an Argument Type

In some embodiments, an additional classifier may be applied at the argument level of a text string to validate an argument type. For example, if the text string "set the alarm to XYZ," maps to an identified action of setting an alarm, the additional classifier may verify that XYZ is a valid argument such as "noon," "five minutes from now," or "four o'clock," before initiating the action corresponding to the initial classifier. If the validator fails, this may be an indicator that the initial classifier was incorrectly selected, and therefore another classifier (corresponding to the same or another action) may be selected. In another example, a PSA module (e.g. one that uses CRF statistical modeling methods) may be used to validate an argument.

7. Select a Classifier Based on an Initiated Action

In some embodiments, a classifier may be selected based on a previously initialed action in addition to a string-feature and/or sensor-feature vector. For example, consider that the computing device receives an utterance "show me a map of XYZ city," which causes the computing device to select a first classifier and to initiate a first action of launching a mapping application and showing the XYZ city. Further consider that the computing device then receives an utterance "take me there." In addition to considering a string-feature vector, the computing device may consider the first action when selecting a second classifier. This may result in the computing device selecting a second classifier that corresponds to a second action of providing directions (based on the first action relating to a mapping service). Notably, had the computing device not considered the first action, the computing device may not have selected the second classifier, and therefore the computing device may have initiated a different action.

IV. Examples of Benefits

Classifiers provide a solution for mapping a text string to an action with a low level of complexity. Among other things, the use of classifiers in the manners described above reduces or eliminates the need to deeply understand the semantics of the text string, such as for example, by using a PSA module. As noted, PSA modules often involve highly complex analysis techniques. For example, a PSA may be configured to derive linguistic annotators from the text string, and may be further configured to parse those annotators using one or more parsing techniques, such as those based on conditional random field (CRF) or other statistical modeling methods. In another example, a PSA may be configured to apply a set of grammars, such as those encoded in Augmented Backus-Naur Form (ABNF), to the text string to determine its semantic meaning Grammars such as these are typically hand-crafted, and often require input from linguistic experts to ensure that they provide useful results. The computing device may then determine an action that corresponds to the determined semantic meaning of the text string. However, this complex analysis may be avoided though the use of classifiers as described herein.

Further, in some instances a scaled-down version of an ASR module may be used in the first phase, such as by tailoring the ASR module to recognize terms that correspond to string-feature criteria (e.g., term identities) of one or more classifiers. Due to the reduced complexity of both the first and second phases, in some embodiments, the computing device may perform the functions involved in both phases. However, it is contemplated that the present method may also be implemented in a client-server architecture where the computing device communicates with a server that performs one of more of the functions described herein. While the benefits described throughout this disclosure are possible, they are not necessary for all embodiments. Further, the described benefits are provided as examples. Indeed, other benefits may also be provided.

V. Examples of Variations

While each of the functions throughout this disclose have been described as being performed by a computing device, one or more of the functions may be performed different computing devices (or users). For example, one computing device 102 may generate classifiers in the training component, while another computing device may select one of the classifiers. Finally, benefits of the present method may be realized without performing every function described herein, and therefore in various embodiments, subsets of the described functions may be performed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, comprising:
   receiving, by a computing device, an audio utterance;
   determining a text string based on the utterance;
   determining a string-feature vector based on the text string;
   receiving sensor data;
   determining a sensor-feature vector based on the sensor data;
   selecting a target classifier from a set of classifiers, wherein the target classifier is selected based on a determination that a string-feature criteria of the target classifier corresponds to at least one string-feature of the string-feature vector and a sensor-feature criteria of the target classifier corresponds to at least one sensor-feature in the sensor-feature vector; and
   initiating, by the computing device, a target action that corresponds to the target classifier.

2. The method of claim 1, wherein the string-feature criteria comprises at least one criteria in a set of criteria comprising a term-identity criteria, a part-of-speech identity criteria, and a lexical-class identity criteria.

3. The method of claim 1, wherein the sensor-feature criteria comprises at least one criteria in a set of criteria comprising a travel-speed criteria and a user-identity criteria.

4. The method of claim 1, further comprising:
   determining a non-target classifier from the set of classifiers;
   wherein a string-feature criteria of the non-target classifier corresponds to at least one string in the string-feature vector; and
   wherein the non-target classifier is determined based on a determination that a sensor-feature criteria of the non-target classifier does not correspond to any sensor-feature of the sensor-feature vector.

5. The method of claim 4, wherein the non-target classifier corresponds to a non-target action, and wherein the text string has at least two semantic meanings, a first semantic-meaning that corresponds to the target action and a second semantic-meaning that corresponds to the non-target action.

6. The method of claim 5, wherein receiving sensor data comprises receiving sensor data via one of an accelerometer and a GPS receiver included in the computing device;
   wherein the sensor-feature criteria of the target classifier comprises a first travel-speed criteria and the target action comprises launching a mapping application and providing mapping information related to a point-of-interest associated with at least a portion of the text string; and
   wherein the sensor-feature criteria of the non-target classifier comprises a second travel-speed criteria and the non-target action comprises launching a non-mapping application.

7. The method of claim 6, wherein launching a non-mapping application comprises launching a web-browsing application, and wherein the non-target action further comprises loading a website that corresponds to the at least a portion of the text string.

8. The method of claim 6, wherein launching a non-mapping application comprises launching an application associated with the at least a portion of the text string.

9. The method of claim 4, wherein receiving sensor data comprises receiving sensor data via an image-capturing sensor included in the computing device;
   wherein the sensor-feature criteria of the target classifier comprises a first user-identity criteria and the target action comprises sending an email;
   wherein the sensor-feature criteria of the non-target classifier comprises a second user-identity criteria and the non-target action comprises sending an SMS message; and
   wherein determining a sensor-feature vector based on the sensor data comprises determining a user-identity sensor-feature based on a facial-recognition technique and the sensor data.

10. The method of claim 1, the method further comprising:
    determining an argument template that corresponds to the target classifier; and
    parsing the text string for an argument based on the argument template, wherein the target action is based on the argument.

11. The method of claim 1, wherein the set of classifiers is a set of sub-classifiers arranged as children to a parent super-classifier in a hierarchical arrangement.

12. The method of claim 1, wherein the utterance is a first utterance, the text string is a first text-string, the string-feature vector is a first string-feature vector, the sensor data is first sensor-data, and the sensor-feature vector is a first sensor-feature vector, the method further comprising:
receiving a second utterance;
determining a second text-string based on the second utterance;
determining a second string-feature vector based on the second text-string, wherein the first string-feature vector and the second string-feature vector are different;
receiving second sensor-data;
determining a second sensor-feature vector based on the second sensor-data, wherein the first sensor-feature vector and the second sensor-feature vector are different;
selecting the target classifier from the set of classifiers, wherein the target classifier is selected based on a determination that the string-feature criteria corresponds to at least one string-feature of the second string-feature vector and the sensor-feature criteria corresponds to at least one sensor-feature of the second sensor-feature vector; and
initiating the target action.

13. A computer-readable storage medium, having stored thereon program instructions that, upon execution by a computing device, cause the computing device to perform a set of operations comprising:
receiving an audio utterance;
determining a text string based on the utterance;
determining a string-feature vector based on the text string;
receiving sensor data;
determining a sensor-feature vector based on the sensor data;
selecting a target classifier from a set of classifiers, wherein the target classifier is selected based on a determination that a string-feature criteria of the target classifier corresponds to at least one string-feature of the string-feature vector and a sensor-feature criteria of the target classifier corresponds to at least one sensor-feature in the sensor-feature vector; and
initiating a target action that corresponds to the target classifier.

14. The computer-readable storage medium of claim 13, wherein the string-feature criteria comprises at least one criteria in a set of criteria comprising a term-identity criteria, a part-of-speech identity criteria, and a lexical-class identity criteria.

15. The computer-readable storage medium of claim 13, wherein the sensor-feature criteria comprises at least one criteria in a set of criteria comprising a travel-speed criteria and a user-identity criteria.

16. The computer-readable storage medium of claim 13, the set further comprising:
determining a non-target classifier from the set of classifiers;
wherein a string-feature criteria of the non-target classifier corresponds to at least one string in the string-feature vector; and
wherein the non-target classifier is determined based on a determination that a sensor-feature criteria of the non-target classifier does not correspond to any sensor-feature of the sensor-feature vector.

17. The computer-readable storage medium of claim 16, wherein the non-target classifier corresponds to a non-target action, and wherein the text string has at least two semantic meanings, a first semantic-meaning that corresponds to the target action and a second semantic-meaning that corresponds to the non-target action.

18. A computing device comprising:
a user interface having an input component;
a processor; and
a computer-readable storage medium, having stored thereon program instructions that, upon execution by the processor, cause the computing device to perform a set of operations comprising:
receiving an audio utterance via the input component;
determining a text string based on the utterance;
determining a string-feature vector based on the text string;
selecting a target classifier from a set of classifiers, wherein the target classifier is selected based on a determination that a string-feature criteria of the target classifier corresponds to at least one string-feature of the string-feature vector; and
initiating a target action that corresponds to the target classifier.

19. The computing device of claim 18, wherein the target classifier is selected based further on an action previously initiated by the computing device.

20. The computing device of claim 18, wherein the utterance is a first utterance, the text string is a first text-string, the string-feature vector is a first string-feature vector, the set of operations further comprising:
receiving a second utterance;
determining a second text-string based on the second utterance;
determining a second string-feature vector based on the second text-string, wherein the first string-feature vector and the second string-feature vector are different;
selecting the target classifier from the set of classifiers, wherein the target classifier is selected based on a determination that the string-feature criteria corresponds to at least one string-feature of the second string-feature vector and the sensor-feature criteria corresponds to at least one sensor-feature of the second sensor-feature vector; and
initiating the target action.

21. A method, comprising:
receiving, by a computing device, an audio utterance;
determining a text string based on the utterance;
determining a string-feature vector based on the text string;
receiving sensor data;
determining a sensor-feature vector based on the sensor data;
determining an identified action; and
generating a classifier, wherein the classifier has a string-feature criteria that corresponds to at least one string-feature in the string-feature vector, has a sensor-feature criteria that corresponds to at least one sensor-feature in the sensor-feature vector, and corresponds to the identified action.

22. The method of claim 21, wherein the string-feature criteria comprises at least one of a term-identity criteria, a part-of-speech identity criteria, and a lexical-class identity criteria.

23. The method of claim 21, wherein receiving sensor data comprises receiving sensor data via one of an accelerometer and a GPS receiver, included in the computing device, and wherein the sensor-feature criteria comprises a travel-speed criteria.

24. The method of claim 22, wherein receiving sensor data comprises receiving sensor data via an image-capturing sensor included in the computing device, and wherein the sensor-feature criteria comprises a user-identity criteria.

25. The method of claim 21, wherein the utterance is a first utterance, the text string is a first text-string, the string-feature vector is a first string-feature vector, the method further comprising:
- receiving a second utterance;
- determining a second text-string based on the second utterance;
- determining a second string-feature vector based on the second text-string; and
- modifying the classifier such that the string-feature criteria further corresponds to at least one string-feature in the second string-feature vector.

* * * * *